Patented Oct. 14, 1930

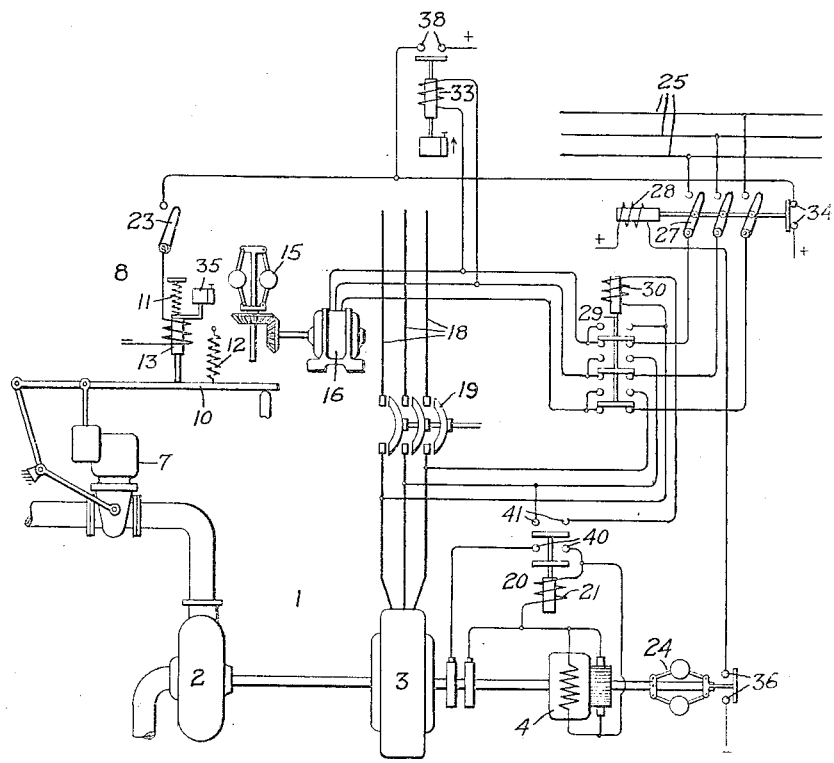

1,778,605

UNITED STATES PATENT OFFICE

CLAUDE W. PLACE, OF LA GRANGE, ILLINOIS, ASSIGNOR TO GENERAL ELECTRIC COMPANY, A CORPORATION OF NEW YORK

PRIME-MOVER-CONTROL SYSTEM

Application filed December 29, 1927. Serial No. 243,413.

My invention relates to prime mover control systems and particularly to systems for automatically starting prime movers which drive dynamo-electric machines and one of its objects is to provide an improved arrangement for preventing a prime mover from accelerating to an abnormal speed during the starting operation thereof.

Another object of my invention is to provide, in a prime mover plant in which the speed of the prime mover is normally controlled by a motor which operates at a speed proportional to the speed of the prime mover, an arrangement for controlling the motor so that it will be operative during the starting operation of the plant to prevent the prime mover from accelerating to an abnormal speed.

In plants where the speed of the prime mover is governed by a motor which operates at a speed proportional to the prime mover speed as is the case where the prime mover drives a generator and the prime mover is controlled by a motor driven fly ball governor the motor of which is normally energized by the generator, it is important that the motor should be operative to control the governor as soon as the prime mover reaches its normal speed during the starting operation so as to prevent the prime mover from running away. In accordance with my invention, I provide an arrangement whereby during the starting operation, the governor motor is controlled independently of the speed of the prime mover so that it is operative to limit the speed of the prime mover during the starting operation.

My invention will be better understood from the following description taken in connection with the accompanying drawing a single figure of which shows diagrammatically a control system for a prime mover dynamo-electric plant embodying my invention, and its scope will be pointed out in the appended claims.

Referring to the drawing 1 represents a prime mover dynamo-electric plant comprising a water wheel 2 driving a generator 3 and an exciter 4. The supply of fluid energy to the water wheel 2 may be controlled by any suitable means such as a gate 7 which in turn is controlled by any suitable governing means 8 examples of which are well known in the art.

As shown in the drawing the governing means comprises a motor driven fly ball governor having a movable member 10 which is arranged in any suitable manner examples of which are well known in the art so that the position thereof determines the opening of the gate. As diagrammatically shown in the drawing the member 10 is in the gate closed position and is held in that position by a closing spring 11 against the bias of an operating spring 12 as long as a magnet 13 is deenergized. Whenever it is desired to place the prime mover 1 in operation it is necessary to energize the magnet 13 which is so arranged that its energization moves the closing spring 11 out of operative relation with the member 10 and allows the spring 12 to move the member to a gate opening position. As long as the magnet 13 is energized the gate opening position of the member 10 depends upon the position of the fly balls 15, which may be driven at a speed proportional to the speed of prime mover by any suitable means such as an electric motor 16 which is normally arranged to be energized by the generator 3.

The generator 3 is arranged to be connected to a load circuit 18 by suitable switching means 19 and the exciter 4 is arranged to be connected to the generator field winding by suitable switching means 20. The operation of the switching means 19 and 20 may be effected in any suitable manner either automatically or manually, examples of which are well known in the art. As shown in the drawing switching means 19 is manually controlled and the switching means 20 is arranged to be closed by a winding 21, which is responsive to the exciter voltage, when the exciter voltage is above a predetermined value.

The initial energization of magnet 13 to start the plant may be effected in any suitable manner examples of which are well known in the art. As shown in the drawing the circuit of the magnet 13, when the plant is shut down, is arranged to be completed by a switch 23. In order to effect a decrease in the gate opening as soon as the plant starts I provide a speed switch 24 which is responsive to the speed of the prime mover and which is arranged to effect the opening of the original starting circuit of the magnet 13 as soon as the prime mover speed reaches a predetermined subnormal value.

It will be noted that due to the slow rate at which the exciter and generator voltages may build up the motor 16, if it were permanently connected to the generator, probably would not be up to its normal speed so as to limit the gate opening to its proper value, by the time the prime mover would reach its normal speed during the starting thereof.

In order that the fly balls 15 may be rotating at substantially normal speed and thereby be operative to limit the position of the member 10 to its normal operating position by the time the prime mover has accelerated to its normal speed, I provide an arrangement whereby during the starting operation the motor 16 is first connected to an auxiliary energized source of current 25 and then when the generator is in an operative condition to supply current to the motor it is transferred from the auxiliary source 25 to the generator 3.

For connecting the motor 16 to the auxiliary source 25 I provide a switch 27 which is arranged to be closed in any suitable manner when the speed of the prime mover is above a predetermined subnormal value. As shown the switch 27 is provided with a closing coil 28 the circuit of which is arranged to be completed in response to the closing of the contacts 36 of the speed responsive means 24. I also provide a switching device 29 which is arranged to be operated to disconnect the motor 16 from the source 25 and to connect the motor 16 to the generator 3 when the generator is in an operative condition to supply current to the motor 16. Any suitable means, examples of which are well known in the art, which is responsive to a predetermined condition of the generator indicating the operative condition thereof such as the speed, voltage, frequency, etc., may be employed to control the selective operation of the switching means 29. As shown in the drawing the switching means 29 is provided with an operating coil 30 which is arranged to be connected across the generator 3 when the switch 20 is closed and which is designed to operate the switching means 29 so as to connect the motor to the generator 3 only when the generator voltage is above a predetermined value. Since the generator voltage depends upon the excitation and speed of the generator it is evident that the operation of the switching means also depends upon both the excitation and speed of the generator. Preferably the necessary generator voltage to operate the switch 29 can be obtained only when the generator is operating at a higher speed than the speed at which the speed responsive device 24 closes its contacts. In order to reenergize the governor magnet 13 after its circuit has been opened by the operation of the speed responsive device 24 and the motor 16 has subsequently reached its normal speed so that the fly balls are operative to control the governor I provide a relay 33 which is responsive to the voltage across the terminals of the fly ball motor 16 and which is arranged when energized a predetermined amount to complete a circuit for the magnet 13. If desirable the relay 33 may be designed in any suitable manner so that it does not operate to reenergize the magnet 13 until a predetermined time after the voltage impressed on the relay 33 is above a predetermined value. Such an arrangement may be desirable in order to insure a predetermined closing of the gate after the prime mover starts.

The operation of the system shown in the drawing is as follows:

When it is desired to start the prime mover plant the switch 23 is closed, so that the magnet 13 is energized through contacts 34 on switch 27 to move the closing spring 11 out of operative relation with the member 10 and to permit the operating spring 12 to move the member 10 to a gate opening position. If desirable, the opening movement of the member 10 may be retarded in any suitable manner such as a dash pot 35. The governor 8 continues, to open the gate 7 until the waterwheel 2 starts and the speed thereof reaches a value sufficient to cause speed responsive means 24 to close its contacts 36. A circuit is then completed for the closing coil 28 of switch 27 so that the fly ball motor 16 is connected across the auxiliary energized source 25 and the original energizing circuit of the magnet 13 is opened at auxiliary contacts 34. The closing spring 11 then causes the member 10 to move towards the gate closing position so that the gate 7 in turn is moved towards its closed position to decrease the supply of water to the water wheel. As soon as the switch 27 closes, the motor 16 starts to rotate and comes up to its normal speed very quickly. Preferably the frequency of the source 25 is substantially the same as the normal frequency of the generator 3 so that the fly balls 15 when the motor 16 is connected to the auxiliary source maintains the speed of the water wheel at substantially the same value it does during normal operating conditions when it is connected to the generator. When the voltage across the terminals of the motor 16 builds up to a predetermined value, relay 33 becomes opera- 'ive to close its contacts 38 and thereby reenergize the magnet 13. This feature of controlling the excitation of the magnet 13 so that a decrease in the gate opening is effected as soon as the water wheel speed reaches a predetermined value is claimed in applicant's divisional application Serial No. 351,274, filed March 30, 1929.

As the water wheel accelerates the voltage of the exciter 4 builds up and when it reaches a predetermined value switch 20 closes its contacts 40 and 41. The closing of the contacts 40 connects the generator field across the terminals of the exciter 4 and the closing of the contacts 41 connects the closing coil 30 of the switching means 29 across the generator terminals so that when the generator voltage is above a predetermined value the switching means 29 is operated to disconnect the fly ball motor 16 from the auxiliary source 25 and to connect the motor 16 across the generator terminals. The fly balls 15 are then driven at a speed dependent upon the frequency of the generator 3 so that the position of the gate 7 is controlled to maintain the speed of the waterwheel at a predetermined value.

It will be noted that if the exciter fails or any other abnormal condition occurs so that either the winding 21 or the winding 30 becomes deenergized while the plant is in operation, the switch 29 operates to reconnect the motor 16 to the auxiliary source 25 so as to prevent the prime mover from running away.

While I have in accordance with the Patent Statues shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, a prime mover, means for controlling the speed of said prime mover comprising a device and means for normally operating said device at a speed dependent upon the speed of said prime mover, means for starting said prime mover, and means for effecting the operation of said device at substantially its normal speed prior to said prime mover reaching its normal speed during the starting operation thereof.

2. In combination, a prime mover, a governor for said prime mover, a speed responsive device for controlling the operation of said governor, means for causing said device to operate at a speed which varies with the speed of said prime mover, means for causing said device to operate at a speed which is independent of the speed of said prime mover, and means dependent upon a predetermined condition of said prime mover for selectively controlling which of said last mentioned means controls the operation of said device.

3. In combination, a prime mover, a generator driven by said prime mover, a fly ball governor for controlling the speed of said prime mover, an electric motor for driving the fly balls of said governor, a source of current, and means dependent upon the voltage of said generator for selectively controlling the connection of said motor to said generator and to said source.

4. In combination, a prime mover, a generator driven by said prime mover, a fly ball governor for controlling the speed of said prime mover, an electric motor for driving the fly balls of said governor, a source of current, and means dependent upon the speed of said generator for selectively controlling the connection of said motor to said generator and to said source.

5. In combination, a prime mover, a generator driven by said prime mover, a fly ball governor for controlling the speed of said prime mover, an electric motor for driving the fly balls of said governor, a source of current, and means controlled in accordance with the excitation of said generator for selectively controlling the connection of said motor to said generator and to said source.

6. In combination, a prime mover, a generator driven by said prime mover, a fly ball governor for controlling the speed of said prime mover, an electric motor for driving the fly balls of said governor, a source of current, means for connecting said motor to said source, and means responsive to a predetermined condition of said generator for effecting the disconnection of said motor from said source and the connection of said motor to said generator.

7. In combination, a prime mover, a generator driven by said prime mover, a fly ball governor for controlling the speed of said prime mover, an electric motor for driving the fly balls of said governor, a source of current, switching means for connecting said motor to said source and to said generator, and electro-responsive means energized by said generator for selectively controlling said switching means.

8. In combination, a prime mover, a generator driven by said prime mover, a fly ball governor for controlling the speed of said prime mover, an electric motor for driving the fly balls of said governor, a source of current, means for connecting said motor to said source, and means responsive to a predetermined condition of said generator indicating that it is in condition to supply current to said motor for effecting the disconnection of said motor from said source and the connection of said motor to said generator.

9. In combination, a prime mover, a generator driven by said prime mover, a fly ball governor for controlling the speed of said prime mover, an electric motor for driving the fly balls of said governor, a source of current, means responsive to a predetermined condition of said generator for effecting the connection of said motor to said source, and means responsive to another predetermined condition of said generator for effecting the connection of said motor to said generator.

10. In combination, a prime mover, a generator driven by said prime mover, a fly ball governor for controlling the speed of said prime mover, an electric motor for driving the fly balls of said governor, a source of current, means responsive to a predetermined subnormal speed of said prime mover for effecting the connection of said motor to said source, and means dependent upon a higher speed of said prime mover for effecting the disconnection of said motor from said source, and the connection of said motor to said generator.

In witness whereof I have hereunto set my hand this 27th day of December, 1927.

CLAUDE W. PLACE.